United States Patent
Jankovsky et al.

(10) Patent No.: US 12,404,203 B2
(45) Date of Patent: Sep. 2, 2025

(54) FIBRE PRODUCING MACHINE WITH IMPROVED MAINTENANCE

(71) Applicant: SAINT-GOBAIN ISOVER, Courbevoie (FR)

(72) Inventors: Jiri Jankovsky, Veliny (CZ); Philippe Morin, Hradec Kralove (CZ)

(73) Assignee: SAINT-GOBAIN ISOVER, Courbevoie (FR)

( * ) Notice: Subject to any disclaimer, the term of this patent is extended or adjusted under 35 U.S.C. 154(b) by 658 days.

(21) Appl. No.: 17/416,241

(22) PCT Filed: Dec. 17, 2019

(86) PCT No.: PCT/FR2019/053103
§ 371 (c)(1),
(2) Date: Jun. 18, 2021

(87) PCT Pub. No.: WO2020/128287
PCT Pub. Date: Jun. 25, 2020

(65) Prior Publication Data
US 2022/0055940 A1 Feb. 24, 2022

(30) Foreign Application Priority Data
Dec. 19, 2018 (FR) ........................................ 1873401

(51) Int. Cl.
*C03B 37/05* (2006.01)
*D01D 5/08* (2006.01)
*D01D 5/18* (2006.01)

(52) U.S. Cl.
CPC ............. *C03B 37/055* (2013.01); *D01D 5/08* (2013.01); *D01D 5/18* (2013.01)

(58) Field of Classification Search
CPC .......................... C03B 37/05–055; D01D 5/18
(Continued)

(56) References Cited

U.S. PATENT DOCUMENTS

| 2,398,707 A | * | 4/1946 | Hawthorne | ........... C03B 37/055 |
| | | | | 65/520 |
| 3,191,452 A | * | 6/1965 | Lipski | ..................... F16H 1/006 |
| | | | | 474/58 |

(Continued)

FOREIGN PATENT DOCUMENTS

| CN | 2608498 Y | 3/2004 |
| EP | 439 385 A1 | 7/1991 |

OTHER PUBLICATIONS

International Search Report as issued in International Patent Application No. PCT/FR2019/053103, dated Mar. 13, 2020.

*Primary Examiner* — Erin Snelting
(74) *Attorney, Agent, or Firm* — Pillsbury Winthrop Shaw Pittman LLP

(57) ABSTRACT

A machine for fiberizing mineral wool by free centrifugation, includes a frame on which is mounted at least one centrifugation wheel, the centrifugation wheel being connected to a transmission shaft designed to rotate it by transmitting the movement of rotation of an output shaft of a drive unit, wherein the machine further includes at least one intermediary transmission box connected at least by one input to the drive rod and by one output to the transmission shaft, the intermediary transmission box being arranged such as to transmit the movement of rotation of the drive shaft to the transmission shaft.

16 Claims, 9 Drawing Sheets

(58) Field of Classification Search
USPC .................................... 474/84, 86, 88, 148
See application file for complete search history.

(56) References Cited

U.S. PATENT DOCUMENTS 5,131,935 A * 7/1992 Debouzie .............. C03B 37/055
                                                                                         65/456
5,411,444 A * 5/1995 Nakamura .............. F16H 55/36
                                                                                         474/167

* cited by examiner

[Fig 1a]
PRIOR ART
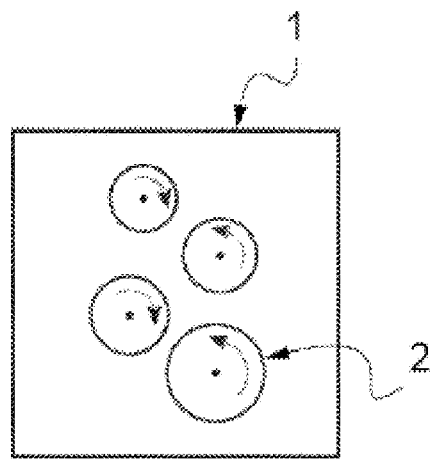
[Fig 1b]
PRIOR ART
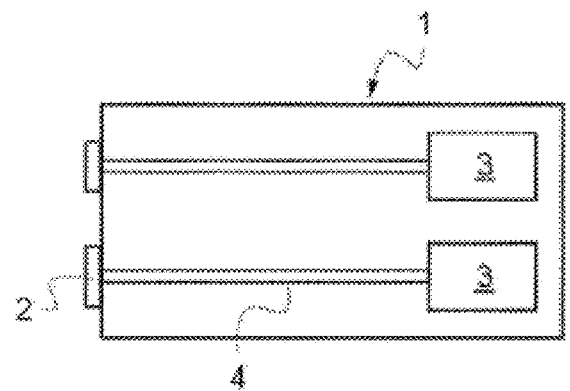

[Fig 2]
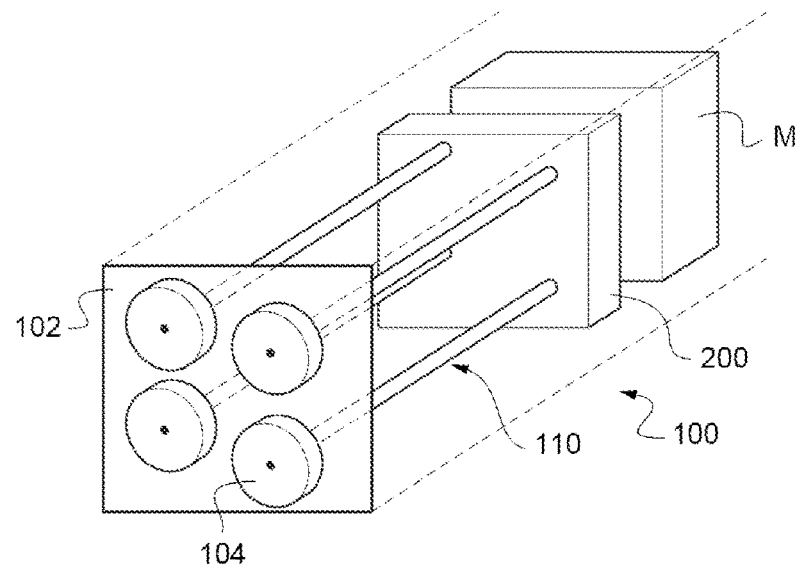
[Fig 3a]
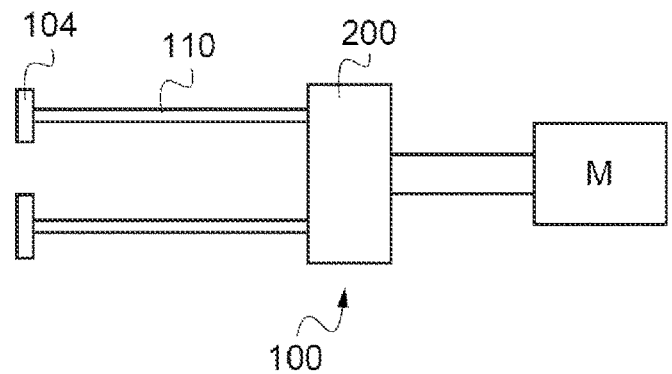
[Fig 3b]
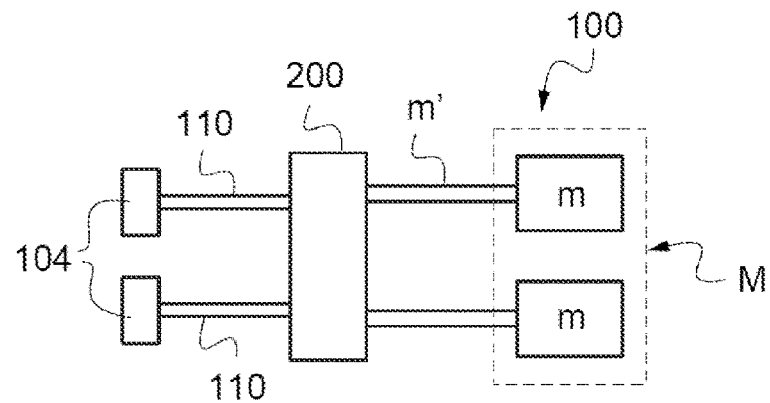

[Fig 3c]
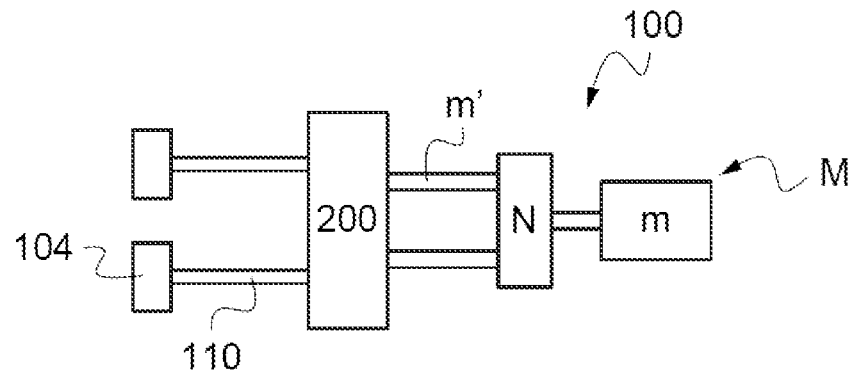
[Fig 4]
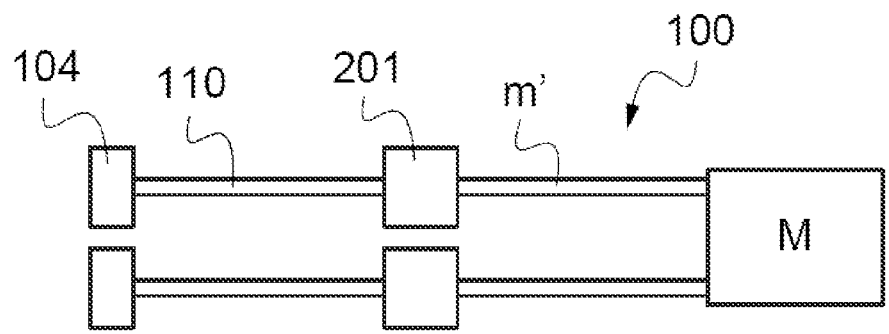
[Fig 5a]
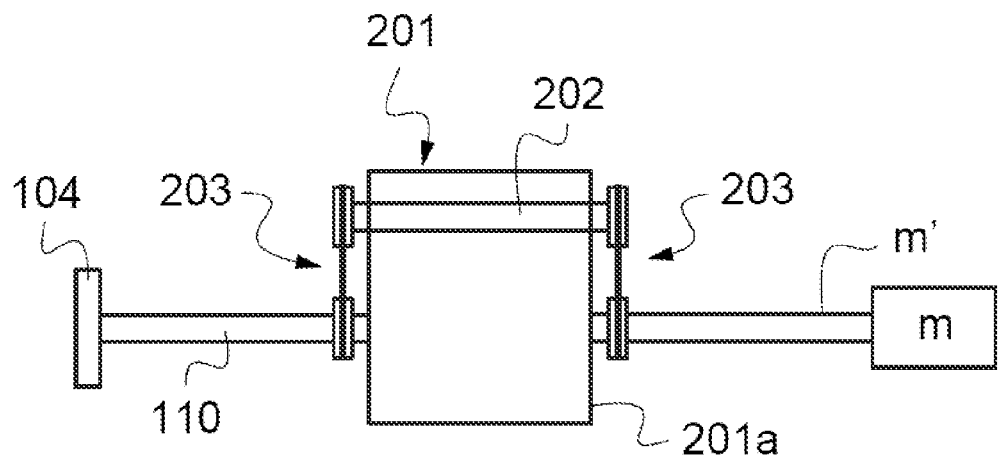

[Fig 5b]
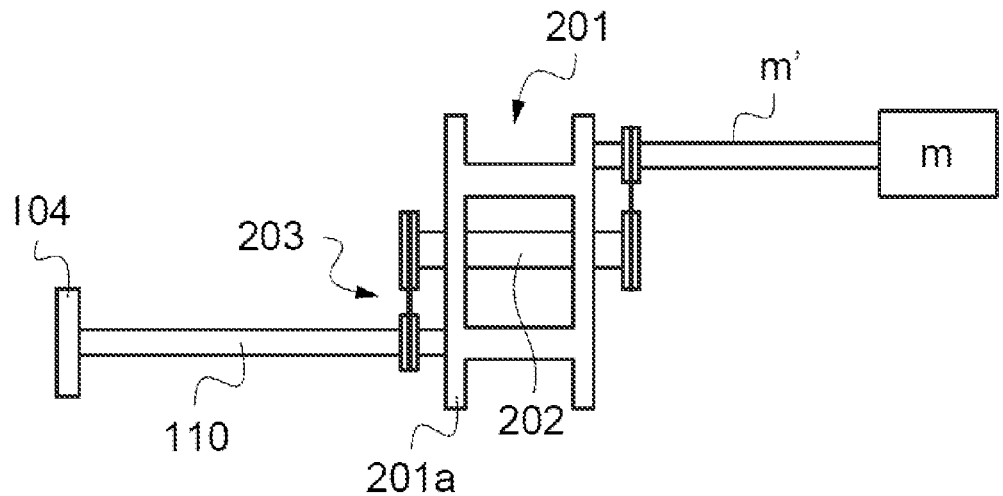
[Fig 6]
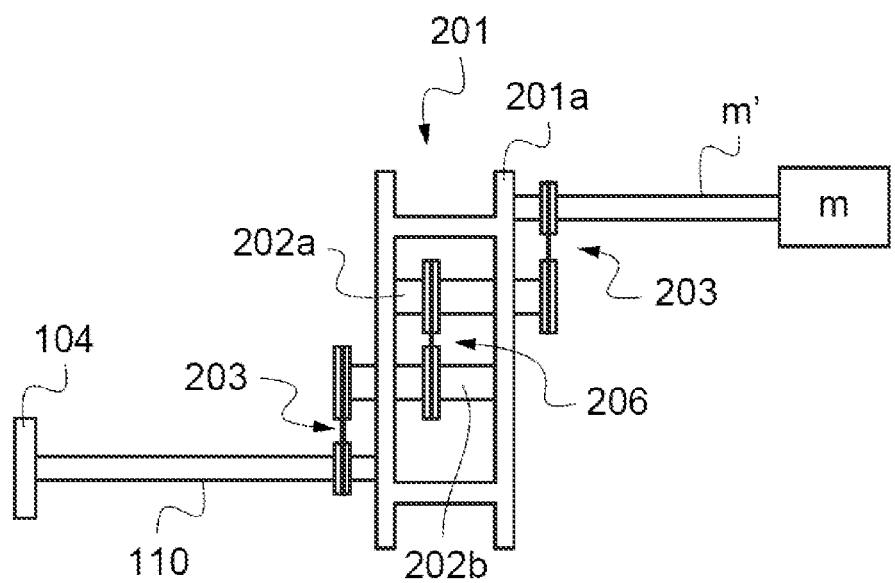

[Fig 7]
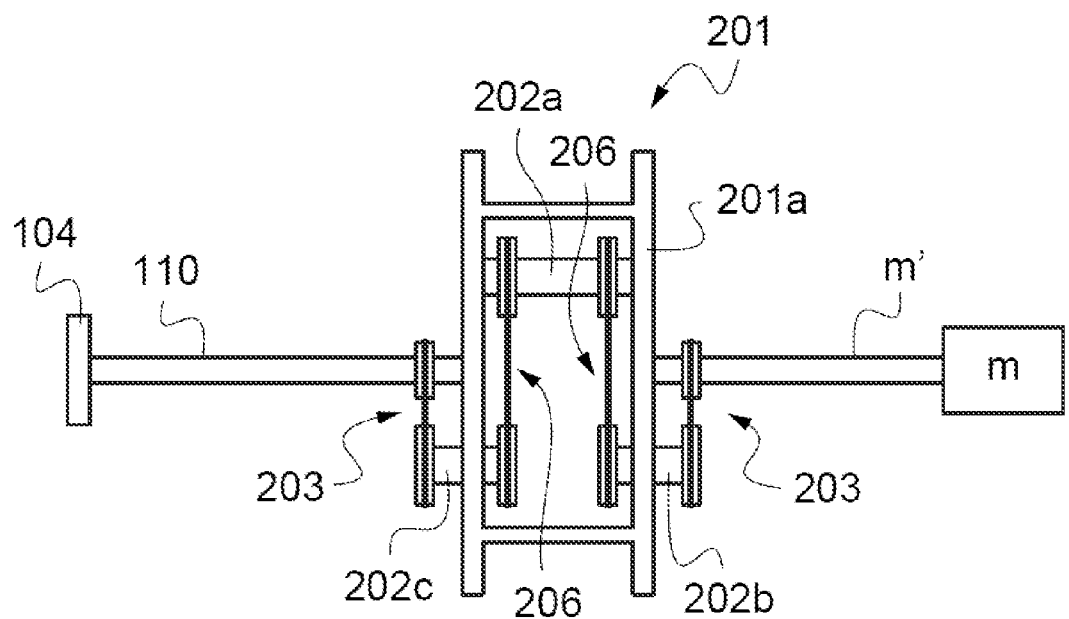
[Fig 8a]
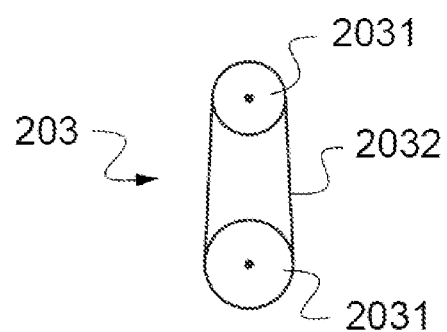

[Fig 8b]
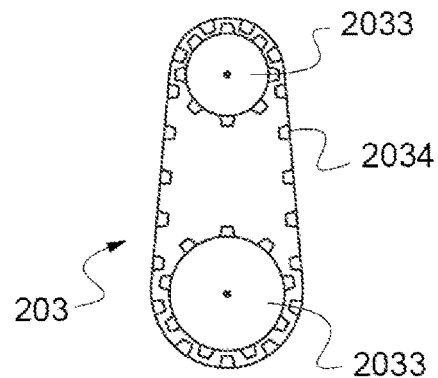
[Fig 8c]
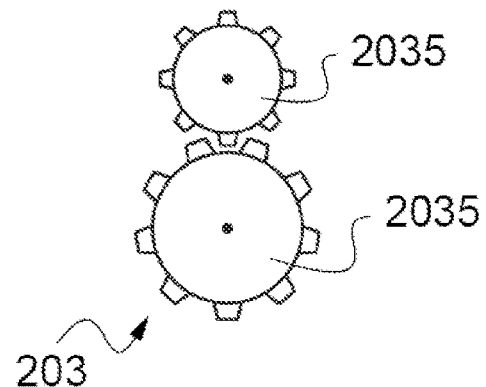
[Fig 9]
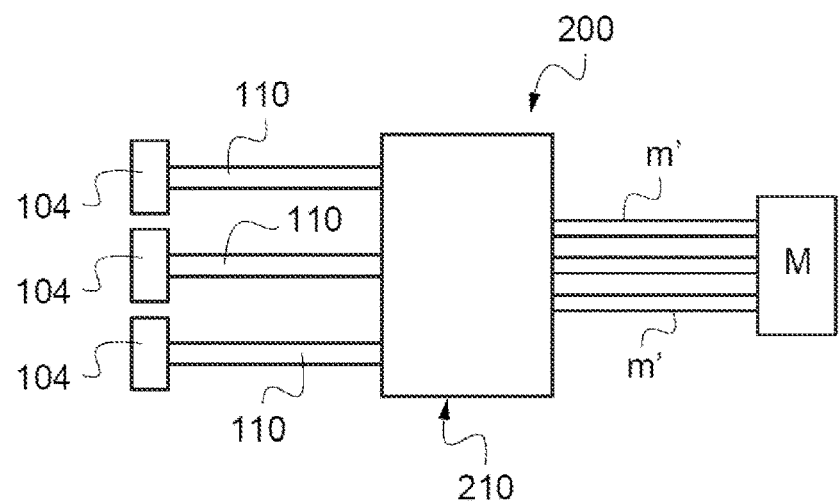

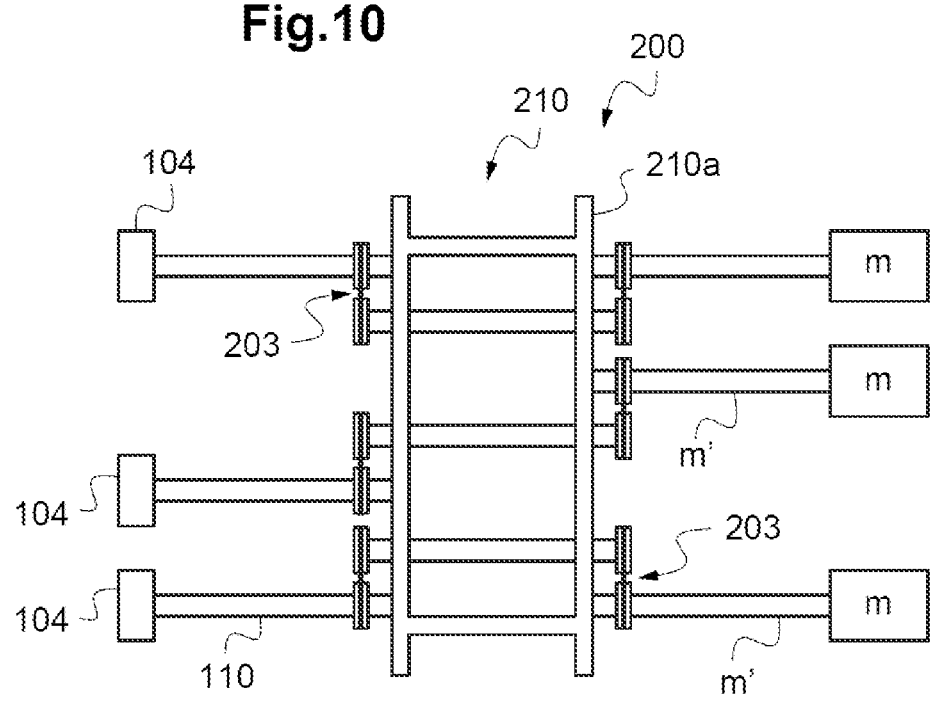
Fig.10
[Fig 11]
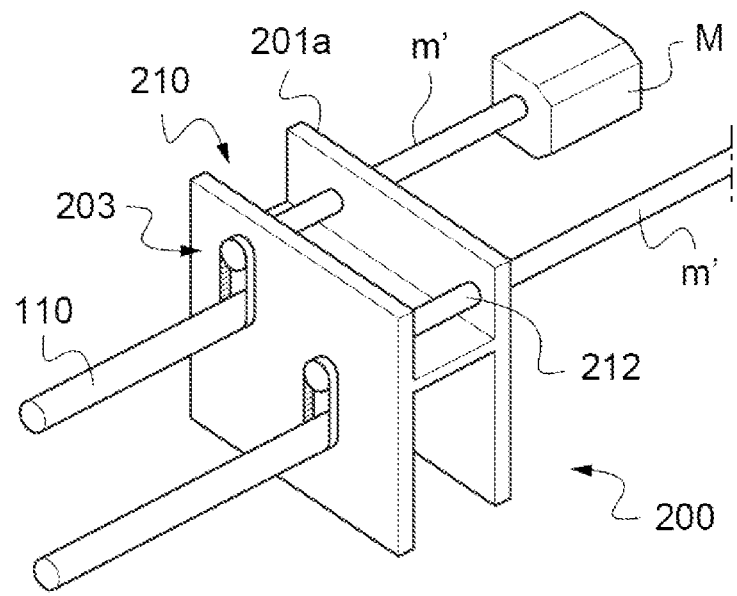

[Fig 12]
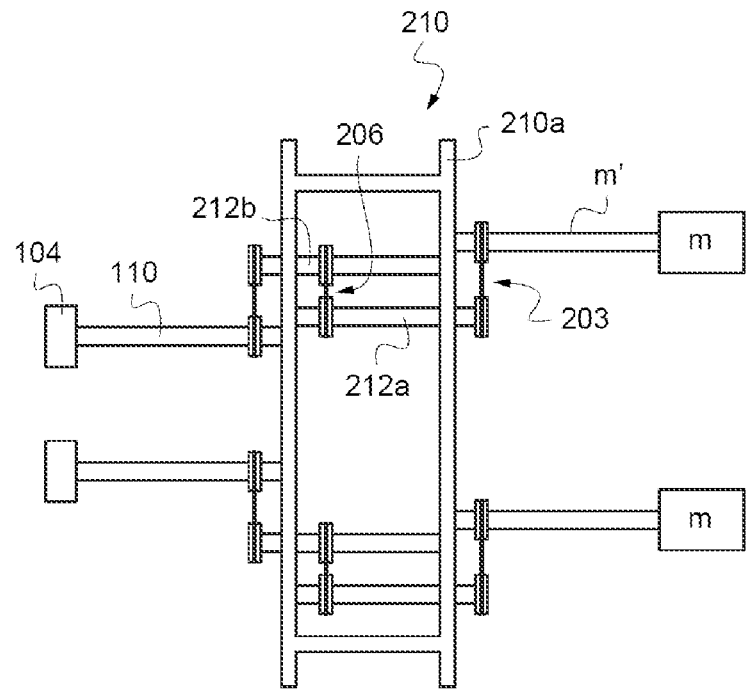
[Fig 13]
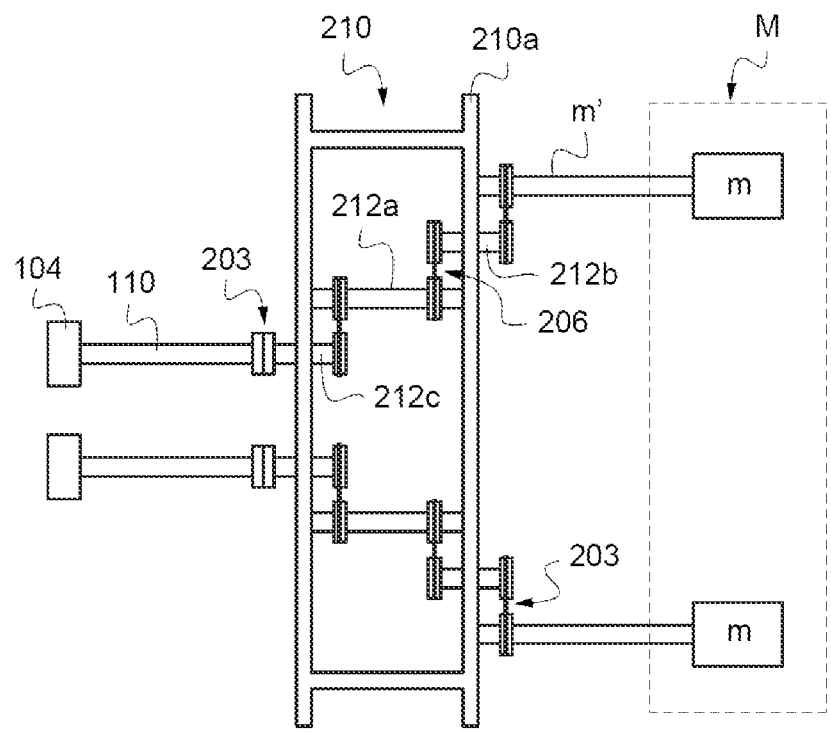

[Fig 14]
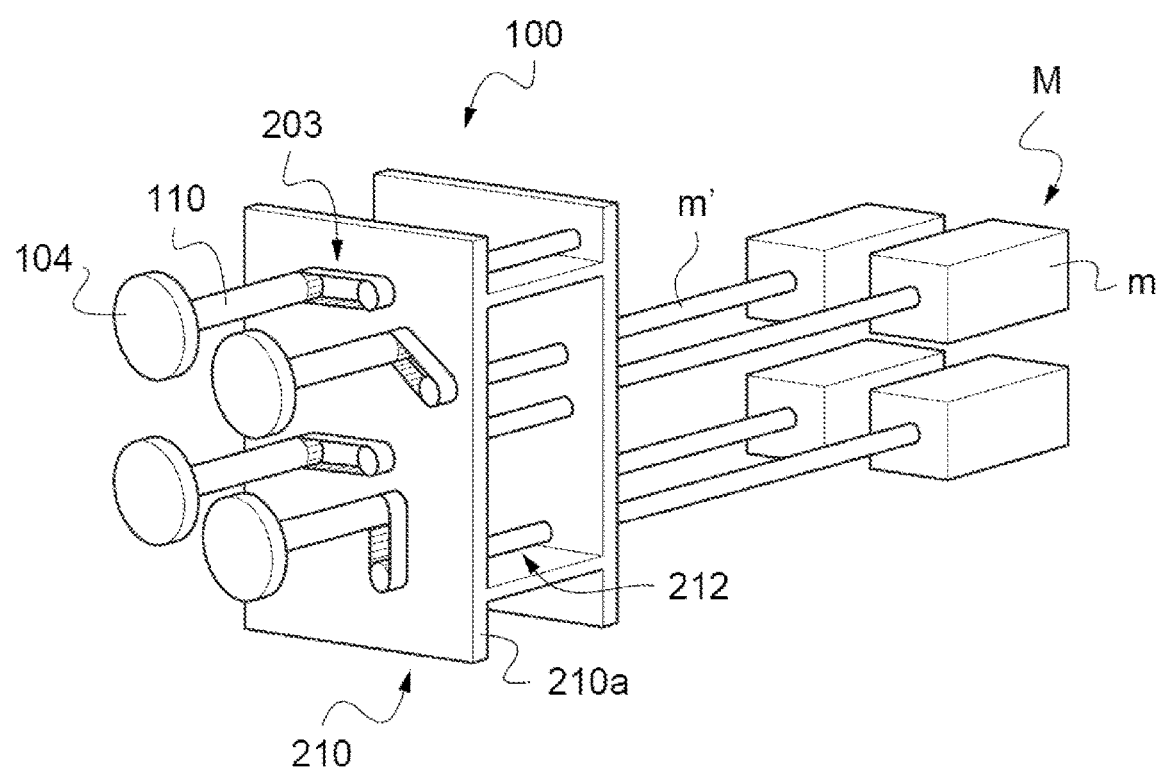

FIBRE PRODUCING MACHINE WITH IMPROVED MAINTENANCE

CROSS-REFERENCE TO RELATED APPLICATIONS

This application is the U.S. National Stage of PCT/FR2019/053103, filed Dec. 17, 2019, which in turn claims priority to French patent application number 1873401 filed Dec. 19, 2018. The content of these applications are incorporated herein by reference in their entireties.

The present invention relates to the field of machines for manufacturing mineral wool.

PRIOR ART

In order to manufacture mineral wool, it is known to use a machine 1 for fiberizing mineral wool by free centrifugation, as may be seen in FIGS. 1a and 1b. This machine for fiberizing mineral wool by free centrifugation conventionally comprises a series of spindles, each bearing a centrifugation wheel or rotor 2. The spindles are arranged in parallel with one another in an assembly placing the peripheral surfaces of the wheels close to one another.

Hitherto, in such a fiberizing machine, the spindles are driven in rotation by a drive 3. The bearings of the spindle are of the ball bearing or roller bearing type. They are lubricated by an oil mist and generally allow speeds of rotation of the shaft 4 of the order of 10000 revolutions per minute (10000 t/min).

More precisely, the spindles are driven in rotation by a drive via the use of a connecting shaft 4. This connecting shaft is used not only to form the link between the drive and the spindle carrying the rotor, but also to supply the binder used in the production of the mineral wool and even to supply and to circulate the cooling liquid for the spindles.

In point of fact, currently, each shaft is in direct engagement with the drive either by screwing of the connecting shaft 4 to the drive shaft or by use of a belt or chain between the drive shaft and the shaft connected to the spindle. When a belt is used, the drive shaft and the connecting shaft are provided with a pulley that makes it possible to modify the gearing-down and to turn the connecting shaft more quickly. A single drive may be provided to turn all the rods.

Thus, this direct engagement of the connecting shaft with the drive involves the drawback of maintenance being complex.

In effect, such a configuration of direct engagement requires the maintenance operative to uncouple the rod from the drive and even to remove the pulleys and the belt in order to carry out maintenance or to make a repair. In point of fact, this operation is complex and time-consuming, and requires the apparatus to be re-set.

Furthermore, this direct engagement also presents the drawback of limiting the possibilities of increasing the speed of rotation and thus of evolutions. In effect, the direct engagement of the rotors with the drives means that the maximum speed of the rotors is the maximum speed of the drives. Thus, the increase in the speed of rotation of the rotors may be achieved only by changing the drive and installing a drive that allows a higher speed of rotation. Such a change of drive is costly because it requires a more highly performing drive. It is also complex because it requires a change of drive for each rotor.

SUMMARY OF THE INVENTION

The present invention thus proposes to provide a machine for fiberizing mineral wool by free centrifugation that resolves the prior-art drawbacks.

To that end, the invention relates to a machine for fiberizing mineral wool by free centrifugation, comprising a frame on which is mounted at least one centrifugation wheel, said centrifugation wheel being connected to a transmission shaft designed to rotate it by transmitting the movement of rotation of an output shaft of a drive unit, characterized in that said machine further comprises at least one intermediary transmission box connected at least by one input to the drive rod and by at least one output to a transmission shaft, said intermediary transmission box being arranged such as to transmit the movement of rotation of the drive shaft to the transmission shaft.

The present invention advantageously makes it possible to have a machine for fiberizing rockwool for which maintenance is simplified. In effect, the presence of an intermediary transmission box advantageously makes it possible to not connect the drive directly to the shafts on which the rotors are arranged. Thus, a change of belt or of pinions takes place by removing the intermediary transmission box without dismantling the transmission shafts.

According to one example, the machine comprises a plurality of centrifugation wheels, each centrifugation wheel being connected to a transmission shaft and comprising an intermediary transmission box for each transmission shaft.

According to one example, each transmission box comprises a chassis in which a rod is mounted, said rod comprising coupling means for coupling to the transmission shaft and to the drive.

According to one example, each transmission box comprises a chassis in which a first rod and a second rod are arranged and extend in parallel in the same direction, the first rod and the second rod are mechanically coupled to coupling elements, the first rod and the second rod each comprise coupling means in order to be connected, respectively, to the transmission shaft and to the drive unit.

According to one example, a single transmission box is arranged, and this transmission box is arranged such that all the transmission shafts are connected thereto.

According to one example, said transmission box comprises a chassis in which a plurality of rods extending in parallel in the same direction is arranged, each rod comprising coupling means in order for each one to be connected to a transmission shaft and to the drive unit.

According to one example, said transmission box comprises a chassis in which, for each transmission shaft, a first rod and a second rod are arranged and extend in parallel in the same direction, the first rod and the second rod are mechanically coupled to coupling elements, the first rod and the second rod each comprise coupling means in order to be connected, respectively, to the transmission shaft and to the drive unit.

According to one example, the coupling means and/or the coupling elements comprise at least two pulleys each fixed to a rod and connected in pairs by a belt.

According to one example, the coupling means and/or the coupling elements comprise at least two pinions for coupling two rods together.

According to one example, the coupling means and/or the coupling elements comprise at least two pinions meshing together for coupling two rods together.

According to one example, the coupling means and/or the coupling elements are arranged such as to allow an output rod to have a speed of rotation that is different from that of an input rod, preferably such as to have a higher speed of rotation.

DESCRIPTION OF THE FIGURES

Other particular features and advantages will become clearly apparent from the following description made thereof by way of indication and in a completely non-limiting manner, with reference to the appended drawings in which:

FIGS. 1a and 1b are schematic representations of a fiberizing machine according to the prior art;

FIGS. 2, 3a, 3b, and 3c are schematic representations of a fiberizing machine according to the invention;

FIGS. 4 to 8 are schematic representations of different implementations of the first embodiment of the invention;

FIGS. 9 to 14 are schematic representations of the second embodiment of the invention.

DETAILED DESCRIPTION OF THE INVENTION

FIGS. 2 and 3a show a machine 100 for fiberizing mineral wool by free centrifugation according to the invention. Such a machine 100 for fiberizing mineral wool by free centrifugation comprises a frame 102 on which the various elements are mounted.

On the frame 102, a plurality of spindles or centrifugation wheels or rotors 104, at least 3 in number, preferably three or four or more, are arranged in cascade and are capable of turning about substantially horizontal axes, two successive wheels 104 on the path of the molten material turning in the opposite direction. The first centrifugation wheel 104 is supplied with molten material by a channel and essentially serves to accelerate the material, which is returned toward the second centrifugation wheel 104 and so on and so forth as far as the last centrifugation wheel, the flow of material diminishing at each centrifugation wheel 104 owing to the quantity of formed fibers.

Such a machine 100 generally further comprises means for generating an air current (not shown) at the periphery of the centrifugation wheels with the aim of assisting the formation of the fibers by means of a drawing effect and of taking up the fiberized material, separating it from the non-fiberized material (pellets). This latter is undesirable as it contributes to making the final product heavier and particularly unpleasant to the touch. The air current also has the function of conveying the fiberized material toward a receiving member, for example an endless belt provided with suction compartments, which conveys the fibers toward the downstream processing devices of the line, such as a cross-lapping device, a binder polymerization oven, etc.

The air current is usually introduced in a direction substantially parallel to the axes of rotation of the centrifugation wheels 104 and thus entrains the fibers in a direction perpendicular to their direction of formation. The quantity of fibers manufactured is dependent on the rate of flow of material poured onto the centrifugation wheels 104 and the fiberizing efficiency of said centrifugation wheels 104.

The centrifugation wheels 104 are connected to a drive unit M in order to be rotated. Each centrifugation wheel 104 is connected to a transmission shaft 110 allowing connection to the drive unit M. In FIG. 3c, the drive unit M comprises, in a first case, a single drive m associated with a gear unit N to make it possible to have a plurality of outputs m' and thus to entrain a plurality of centrifugation wheels 104 in rotation. In a second case, shown in FIG. 3b, the drive unit M comprises a plurality of independent drives m each having an output m'.

The transmission shafts 110 connecting the centrifugation wheels 104 to the drive unit M may be solid or hollow. Where a transmission shaft 110 is hollow, it may comprise at least one conduit allowing the cooling of the wheels 104 and/or one conduit for supplying the binder to the centrifugation wheels 104 in order to manufacture the rock wool.

Ingeniously, according to the invention, the transmission shafts 110 are not meshed directly with the drive unit M. In effect, the machine 100 according to the present invention further comprises intermediary transmission means 200 arranged between the drive unit M and each transmission shaft 110.

In a first embodiment that can be seen in FIG. 4, these intermediary transmission means 200 comprise a plurality of intermediary transmission boxes 201, each intermediary transmission box 201 being connected to a transmission shaft 110. It will be understood that, where there is a single drive m, the intermediary transmission boxes 201 are all connected to the outputs m' of said drive m, whereas in the case of a fiberizing machine 100 having a plurality of drives each intermediary transmission box 201 is connected to the output m' of a drive m.

In a first implementation that can be seen in FIGS. 5a and 5b, each intermediary transmission box 201 comprises a chassis 201a in which a rod 202 comprising a first end and a second end is arranged. This chassis 201a may be faired (FIG. 5a) or unfaired (FIG. 5b). These ends are arranged such as to lie outside the faired or unfaired chassis. At its ends, the rod 202 comprises coupling means 203 for its coupling to the transmission shaft 110 and to the drive unit M.

One advantage of this intermediary transmission box 201 according to the invention is that it allows easy assembly and dismantling by means of simple action on the coupling means 203 in order to uncouple said intermediary transmission box 201 from the drive unit M and from the transmission shaft 110 to which it is coupled. Thus, in the event of replacement or maintenance, it is easy to gain access to this intermediary transmission box 201. Similarly, in the event of maintenance to be carried out on the centrifugation wheels 104, it is easy to dismantle only the centrifugation wheels 104 and the transmission shafts 110 while keeping the intermediary transmission box 201 connected to the drive unit M.

In a second implementation that can be seen in FIG. 6, each transmission box 201 comprises a chassis 201a in which two rods 202a, 202b are mounted. The rods 202a, 202b are arranged such as to extend in parallel in the same direction. The first rod 202a and the second rod 202b are arranged such as to be coupled mechanically. This coupling is achieved by coupling elements 206. The first rod 202a is arranged such as to be coupled to the drive m while the second rod 202b is arranged such as to be coupled to the centrifugation wheel 104.

These coupling elements 206 comprise a belt system comprising a pulley on the rod 202a and a pulley on the rod 202b, a belt connecting the two pulleys.

Alternately, these coupling elements 206 comprise a chain system comprising a toothed wheel on the rod 202a and a toothed wheel on the rod 202b, a chain connecting the two toothed wheels.

Alternately, these coupling elements 206 comprise a gearing system comprising a pinion on the rod 202a and a pinion on the rod 202b. The pinions are meshed with one another directly or indirectly via other pinions.

The first rod 202a and the second rod 202b also each comprise coupling means 203 such as to be connected, respectively, to the transmission shaft 110 and to the drive unit M.

In a third implementation that can be seen in FIG. 7, each transmission box 201 comprises three rods 202a, 202b, 202c. The rods 202a, 202b, 202c are arranged such as to extend in parallel in the same direction. The first rod 202a is arranged such as to be connected mechanically to the second rod 202b and the third rod 202c by means of coupling elements 206. Coupling means 203 are arranged to connect the transmission box 201 to the transmission shaft 110 and to the drive unit M. The second rod 202b is coupled to the drive unit M and the third rod 202c is coupled to the transmission shaft 110.

It is possible for the coupling elements 206 to allow the coupling of the first rod 202a to the second rod 202b to be different from the coupling elements 206 allow the coupling of the first rod 202a to the third rod 202c.

The advantage of the second implementation and of the third implementation is to allow the presence of standard coupling means 203 while permitting an increase in the speed of rotation.

In effect, the presence of the coupling elements 206 allows the presence of a gearing-down between the rods 202a, 202b, 202c in order to increase the speed of rotation of the centrifugation wheel 104 relative to the speed of rotation of the drive.

This possibility enables gearing-down to be dispensed with at the coupling means 203. The latter may thus be standard, i.e. identical for each intermediary transmission box 201 of one and the same fiberizing machine 100.

As a result, not only is it possible to retain an existing drive m in order to obtain a higher speed of rotation than it is able to provide but furthermore it is possible to invert the intermediate transmission boxes 201 between the different drives m according to requirements.

For these different implementations of the first embodiment, the coupling means 203 may comprise a belt system comprising a pulley 2031 on the rod 202 and a pulley 2031 on the transmission shaft 110 or on an output m' of the drive unit. A belt 2032 connects the two pulleys 2031 as may be seen in FIG. 8a.

Alternately, these coupling means 203 may comprise a chain system comprising a toothed wheel 2033 on the rod 202 and a toothed wheel 2033 on the transmission shaft 110 or on an output m' of the drive unit. A chain or notched belt 2034 connects the two toothed wheels as may be seen in FIG. 8b.

Alternately, these coupling means 203 may comprise a gearing system comprising a pinion 2035 on the rod 202 and a pinion 2035 on the transmission shaft 110 or on an output m' of the drive unit M. The pinions 2035 are meshed with one another directly or indirectly via other pinions 2035 as may be seen in FIG. 8c.

Alternately, the shaft 110 may be in direct engagement with the rod 202 of the intermediary transmission box 200 via screws or teeth extending in the same direction as the rod. Naturally, in the case of the first implementation, the coupling means 203 are, optionally, arranged such as to allow a gearing-down, increasing the speed of the centrifugation wheel 104 relative to the speed of the drive m.

This intermediary transmission box 201 also offers the advantage of enabling the centrifugation wheel 104 to not lie in the axis of the drive rod m'. It is thus possible to position the centrifugation wheels 104 as desired.

In a second embodiment that can be seen in FIGS. 9 to 11, the fiberizing machine 100 according to the present invention comprises intermediary transmission means 200 arranged such that all the transmission shafts 110 are connected thereto. To that end, the intermediary transmission means 200 comprise a single intermediary transmission box 210.

In a first implementation of this second embodiment, this single intermediary transmission box 210 comprises a chassis 210a in which a plurality of rods 212 is arranged. The number of rods 212 is equal to the number of wheels 104. Thus, each rod 212 comprises coupling means 203 in order to be coupled to the drive unit M and to the centrifugation wheels 104 as may be seen in FIGS. 10, 11, and 14.

In a second implementation to this second embodiment that can be seen in FIG. 12, each rod 212 is replaced by two rods 212a, 212b arranged such as to extend in parallel in the same direction. The first rod 212a and the second rod 212b are arranged such as to be coupled mechanically by coupling elements 206. The first rod 212a is arranged such as to be coupled to the drive m while the second rod 212b is arranged such as to be coupled to the centrifugation wheel 104.

In a third implementation to this second embodiment that can be seen in FIG. 13, each transmission box 210 comprises three rods 212a, 212b, 212c. The rods 212a, 212b, 212c are arranged such as to extend in parallel in the same direction. The first rod 212a is arranged such as to be mechanically with the second rod 212b and the third rod 212c by means of coupling elements 206. The second rod 212b is coupled to the drive unit M by coupling means 203. The third rod 212c is coupled to the transmission shaft 110 by coupling means 203. In the case of FIG. 13, the coupling means 203 coupling the transmission shaft 110 to the transmission box 210 are simply bolting of said shaft 110 to the rod 212c of the transmission box 210.

For these different implementations of the second embodiment, the coupling means 203 may comprise a belt system comprising a pulley on the rod 202 and a pulley on the transmission shaft 110 or on an output m' of the drive unit. A belt connects the two pulleys.

Alternately, these coupling means 203 may comprise a chain system comprising a toothed wheel on the rod 202 and a toothed wheel on the transmission shaft 110 or on an output m' of the drive unit. A chain connects the two toothed wheels.

Alternately, these coupling means 203 may comprise a gearing system comprising a pinion on the rod 202 and a pinion on the transmission shaft 110 or on an output m' of the drive unit M. The pinions are meshed with one another directly or indirectly via other pinions.

Alternately, the shaft 110 may be in direct engagement with the rod of the intermediary transmission box 200 via screws or teeth extending in the same direction as the rod.

Naturally, in a variant of the different implementations, the coupling means 203 or the coupling elements 206 are arranged such as to make it possible to modify the speed between an input rod, connected directly or indirectly to the drive unit M, and an output rod connected directly or indirectly to the centrifugation wheel 104. This variation in the speed of rotation is obtained by modifying the gearing or the pulleys or the toothed wheels forming coupling elements 206 and/or the coupling means 203 such as to obtain a gearing-down.

In the case of coupling means 203 and/or coupling elements 206 comprising pulleys connected by a belt, the pulley of the output rod will be of smaller diameter than that of the input rod.

In the case of coupling means 203 and/or coupling elements 206 comprising toothed wheels connected by a chain, the toothed wheel of the output rod will be of smaller diameter and will have fewer teeth than that of the input rod.

In the case of coupling means 203 and/or of coupling elements 206 comprising a gearing comprising at least two pinions meshed with one another, the pinion of the output rod will be of smaller diameter and will have fewer teeth than that of the input rod.

This variant advantageously makes it possible to be able to increase the speed of rotation of the rotors/centrifugation wheels 104 without the need for a more highly performing drive unit M. It becomes easy to modify the coupling means 203 or the coupling elements 206 in order to adapt to the desired speed of rotation.

Furthermore, having intermediary transmission boxes 210 with identical coupling means 203 advantageously makes it possible to standardize these components, which tend to wear. As a result, this standardization affords an advantage in terms of maintenance as there is only a single model of intermediary transmission box 210.

In a variant of the embodiments, the transmission shaft 110 is composed of two half-shafts. These half-shafts are connected to one another by coupling means that may be a belt associated with two pulleys or a chain associated with two toothed wheels or two pinions meshing with one another. A first half-shaft is connected to the intermediary transmission box while the second half-shaft is connected to the centrifugation wheel 104 used for fiberizing.

This variant advantageously makes it possible to have standard intermediary transmission boxes 201, 210 and to implement an increase in the speed of rotation of the associated rotor. In effect, the coupling elements are designed such that the second half-shaft connected to the centrifugation wheel 104 has a speed of rotation greater than the speed of rotation of the first half-shaft connected to the intermediary transmission box 201, 210. This is possible by configuring the pulleys or the toothed wheels or the pinions such that the pulley or the toothed wheel or the pinion installed on the second half-shaft is smaller than the pulley or the toothed wheel or the pinion installed on the first half-shaft. In the case of the toothed wheel or of the pinion, this reduction in size is accompanied by a reduction in the number of teeth.

Naturally, the present invention is not limited to the example illustrated but may be the subject of diverse variants and modifications that will be apparent to a person skilled in the art.

Thus, it is possible to design the intermediary transmission boxes 201, 210 such that the coupling means 203 and/or the coupling elements 206 are different in nature.

The invention claimed is:

1. A machine for fiberizing mineral wool by free centrifugation, the machine extending along a longitudinal direction and comprising:
    a drive unit positioned at a first location along the longitudinal direction and including an output rod that extends along the longitudinal direction;
    a frame positioned at a second location along the longitudinal direction and on which is mounted at least one centrifugation wheel, said at least one centrifugation wheel being connected to a transmission shaft extending parallel to said longitudinal direction and adapted to rotate the at least one centrifugation wheel by transmitting a movement of rotation of the output rod of the drive unit, and
    at least one intermediary transmission box connected at least by one input to the output rod of the drive unit and by at least one output to the transmission shaft, said at least one intermediary transmission box being arranged at an intermediate location along the longitudinal direction that is between the first location and the second location and between the output rod and the transmission shaft such as to transmit the movement of rotation of the output rod of the drive unit to the transmission shaft,
    wherein the output rod is connected to the at least one intermediary transmission box using a first belt and at least one first pulley,
    wherein the belt is coupled to a separate rod arranged in the at least one intermediary transmission box,
    wherein the separate rod is coupled to the transmission shaft via a second belt and a second pulley, and
    wherein the second belt and the second pulley are arranged between the at least one intermediary transmission box and the at least one centrifugation wheel.

2. The fiberizing machine as claimed in claim 1, comprising a plurality of centrifugation wheels, each centrifugation wheel being connected to a transmission shaft and comprising an intermediary transmission box for each transmission shaft.

3. The fiberizing machine as claimed in claim 2, wherein each transmission box comprises a chassis in which a rod is mounted, said rod comprising coupling means for coupling to the transmission shaft and to the drive unit.

4. The fiberizing machine as claimed in claim 3, wherein the coupling means comprise at least two pulleys each fixed to a rod and connected in pairs by a belt.

5. The fiberizing machine as claimed in claim 4, wherein the coupling means are arranged such as to allow the output rod to have a speed of rotation that is different from that of the transmission shaft.

6. The fiberizing machine as claimed in claim 5, wherein the transmission shaft has a speed of rotation higher than that of the output rod.

7. The fiberizing machine as claimed in claim 3, wherein the coupling means comprise at least two pinions for coupling two rods together.

8. The fiberizing machine as claimed in claim 3, wherein the coupling means comprise at least two pinions meshing together for coupling two rods together.

9. The fiberizing machine as claimed in claim 2, wherein each transmission box comprises a chassis in which a first rod and a second rod are arranged and extend in parallel in the same direction, the first rod and the second rod are mechanically coupled to coupling elements, the first rod and the second rod each comprise coupling means in order to be connected, respectively, to the transmission shaft and to the drive unit.

10. The fiberizing machine as claimed in claim 1, comprising a plurality of transmission shafts and a plurality of centrifugation wheels that are each connected to one of the plurality of transmission shafts, wherein the at least one intermediary transmission box is a single transmission box, and said single transmission box is arranged such that all of the plurality of transmission shafts are connected thereto.

11. The fiberizing machine as claimed in claim 10, wherein said single transmission box comprises a chassis in which a plurality of rods extending in parallel in a same direction is arranged, each rod comprising coupling means in order for each one to be connected to one of the plurality of the transmission shafts and to the drive unit.

12. The fiberizing machine as claimed in claim 10, wherein said single transmission box comprises a chassis in which, for each transmission shaft, a first rod and a second rod are arranged and extend in parallel in a same direction, the first rod and the second rod are mechanically coupled to coupling elements, the first rod and the second rod each comprise coupling means in order to be connected, respectively, to the transmission shaft and to the drive unit.

13. The fiberizing machine as claimed in claim 1, wherein the at least one intermediary transmission box comprises a chassis in which a rod is mounted, said rod being coupled to the output rod of the drive unit and to the transmission shaft.

14. The fiberizing machine as claimed in claim 1, wherein the at least one centrifugation wheel comprises a first and a second centrifugation wheel connected to, respectively, a first and a second transmission shaft.

15. The fiberizing machine as claimed in claim 1, wherein the first belt and the at least one first pulley are arranged between the at least one intermediary transmission box and the drive unit.

16. The fiberizing machine as claimed in claim 1, wherein the separate rod is parallel to the longitudinal direction.

* * * * *